(12) United States Patent
Sun et al.

(10) Patent No.: US 9,534,576 B2
(45) Date of Patent: Jan. 3, 2017

(54) CRYOGENIC LIQUID TURBINE

(75) Inventors: Jinju Sun, Xi'An (CN); Ke Wang, Xi'An (CN); Peng Song, Xi'An (CN)

(73) Assignee: XI'AN JIAOTONG UNIVERSITY, Xi'An, Shaanxi (CN)

( * ) Notice: Subject to any disclaimer, the term of this patent is extended or adjusted under 35 U.S.C. 154(b) by 360 days.

(21) Appl. No.: 14/369,522

(22) PCT Filed: Dec. 30, 2011

(86) PCT No.: PCT/CN2011/085009
§ 371 (c)(1),
(2), (4) Date: Jun. 27, 2014

(87) PCT Pub. No.: WO2013/097171
PCT Pub. Date: Jul. 4, 2013

(65) Prior Publication Data
US 2014/0341716 A1    Nov. 20, 2014

(51) Int. Cl.
*F03B 3/02* (2006.01)
*F03B 11/02* (2006.01)
(Continued)

(52) U.S. Cl.
CPC . *F03B 3/02* (2013.01); *F01D 1/08* (2013.01); *F01D 5/025* (2013.01); *F01D 9/026* (2013.01);
(Continued)

(58) Field of Classification Search
CPC .......... F03B 3/02; F03B 3/183; F03B 11/006; F03B 11/02; F03B 17/06; F03B 17/062; F01D 1/08; F01D 5/025; F01D 9/026; F01D 17/165; F01D 25/14; F01D 25/145; F02C 1/00; Y02E 10/223
See application file for complete search history.

(56) References Cited

U.S. PATENT DOCUMENTS 3,580,045 A * 5/1971 Pfrehm ............... G01F 25/0015
137/625.28
4,534,700 A * 8/1985 Horler ................... F01D 25/145
415/135
(Continued)

FOREIGN PATENT DOCUMENTS

CN    200955408 Y  * 10/2007
CN    101644170 A  *  2/2010
(Continued)

*Primary Examiner* — Richard Edgar
*Assistant Examiner* — Christopher R Legendre

(57) ABSTRACT

A cryogenic liquid turbine is provided, wherein, impeller end of the rotor and nozzle assembly are received into cavity of volute, and main part of the volute is put into perlite cold box; insulation pad is used between the volute and machine housing to insulate heat; impeller outlet is connected to diffuser pipe. A nozzle assembly is connected to the machine housing by a nozzle compression flange; a nozzle compression plate adjusts a compactness of nozzle vanes by a disc spring; a nozzle turntable is connected on a nozzle chassis, and adjusts the nozzle vane stagger angle by adjusting mechanism passing through the volute; impeller shroud side seal is axially fixed on the nozzle compression flange, and a shaft seal is axially fixed to a seal gas part; the seal gas part and an oil seal are axially fixed to the machine housing by a bolt.

7 Claims, 1 Drawing Sheet

(51) Int. Cl.
*F03B 3/18* (2006.01)
*F01D 9/02* (2006.01)
*F01D 17/16* (2006.01)
*F01D 25/14* (2006.01)
*F01D 1/08* (2006.01)
*F03B 11/00* (2006.01)
*F01D 5/02* (2006.01)

(52) U.S. Cl.
CPC ........... *F01D 17/165* (2013.01); *F01D 25/145* (2013.01); *F03B 3/183* (2013.01); *F03B 11/006* (2013.01); *F03B 11/02* (2013.01); *F05B 2210/11* (2013.01); *F05D 2210/11* (2013.01); *F05D 2250/131* (2013.01); *Y02E 10/223* (2013.01); *Y02E 10/226* (2013.01)

(56) References Cited

U.S. PATENT DOCUMENTS

2006/0186671 A1* 8/2006 Honda .................... F03B 13/10
290/54
2014/0341716 A1* 11/2014 Sun .......................... F01D 1/08
415/123

FOREIGN PATENT DOCUMENTS

| CN | 205064385 U | * | 3/2016 |
| JP | 07180563 A | * | 7/1995 |

* cited by examiner

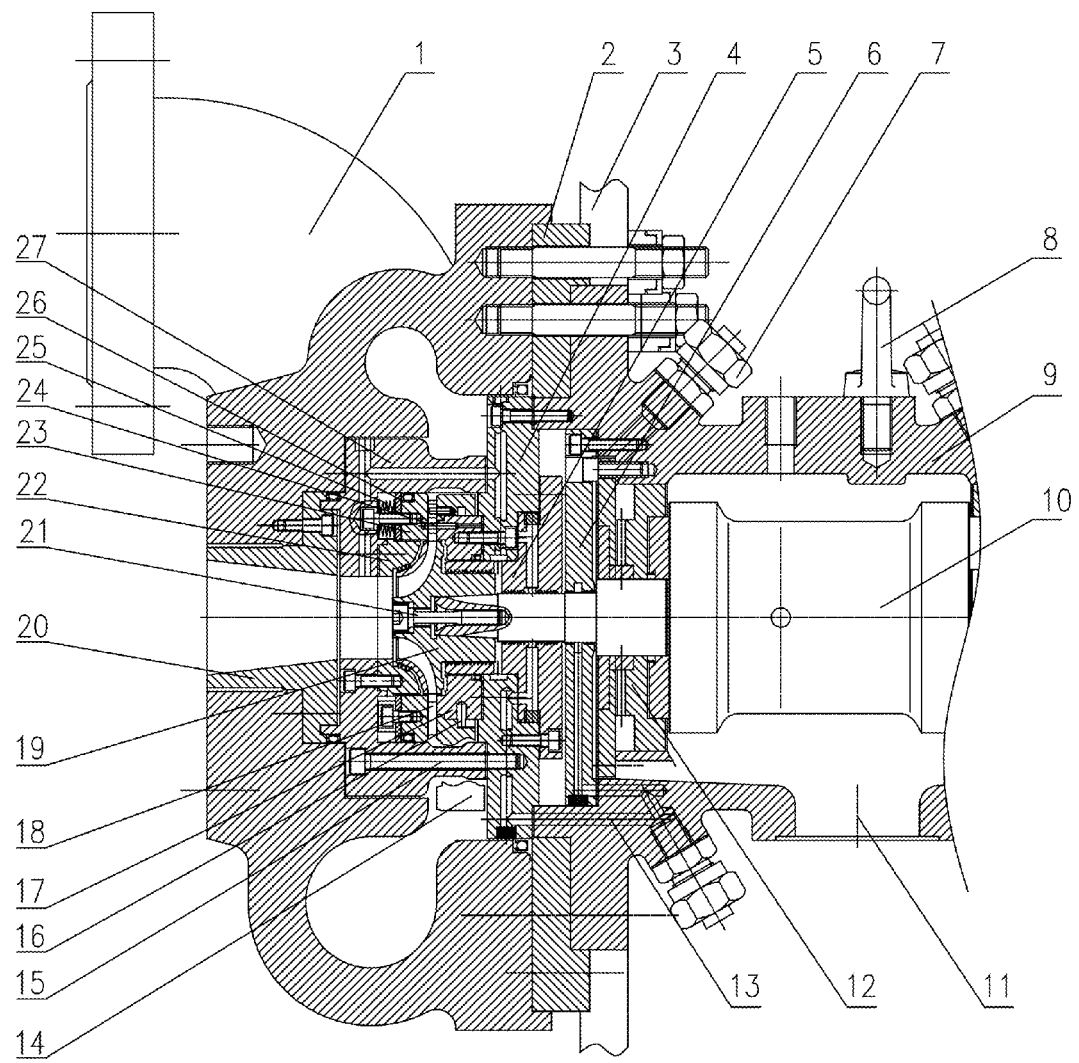

CRYOGENIC LIQUID TURBINE

CROSS REFERENCE OF RELATED APPLICATION

This is a U.S. National Stage under 35 U.S.C. 371 of the International Application PCT/CN2011/085009, filed Dec. 30, 2011.

BACKGROUND OF THE PRESENT INVENTION

Field of Invention

The present invention belongs to the wasted pressure recovery technology in fields of cryogenic liquefaction and cryogenic air separation, relates to a radial-axial type cryogenic liquid turbine, and more particularly to a cryogenic liquid turbine for throttling and decompressing low-temperature and high-pressure liquefied gases.

Description of Related Arts

Energy saving is the main part of and guarantee for the sustainable development strategy of global economy, and can effectively relieve the restriction of the energy bottleneck, so as to help to establish the energy-saving society. Recovering industrial wasted energy in large-scale energy consumption apparatuses is one of key measures of the energy saving, and has great social benefit and economic value. Cryogenic liquid turbine is a substitute product of liquid Joule-Thomson valve in the energy intensive low temperature cycle apparatuses of air separation, liquefied natural gas (LNG), etc. When satisfying a requirement that the pressure needs to be reduced in the technological process, the cryogenic liquid turbine can effectively suppress vaporization, avoid the destruction generated by cavitation and the irreversible loss of the energy of high-pressure liquefied gases, and use high-level pressure head recovered to generate electricity, which has considerable economic benefits.

In patent applications published in recent years, "rotor of expander for throttling high-pressure liquefied gases", whose patent application number is CN200810150526.2; "liquid expander", whose patent application number is CN200910023562.7; and "submerged liquid turbine for decreasing pressure of liquid natural gas" developed by Japanese Ebara company, whose patent application number is US2006/0186671A1 are related to the radial-axial type cryogenic liquid turbine. "Rotor of expander for throttling high-pressure liquefied gases" discloses a rotor of expander for throttling high-pressure liquefied gases, wherein, the rotor is in a horizontal structure with impeller cantilever for meeting the strict requirements of the media flow rate and the braking generators in the conventional liquid expander. The rotor is able to be braked by a conventional generator, pump, or air blower, and is appropriate for decreasing pressure of media with any flow rate. However, an oil slinger is used in the structure of the rotor, i.e., a rotating part is added in the structure so as to decrease the mechanical property of the rotor. "Liquid expander" discloses a single liquid phase expander for throttling liquid, which can solve problems of pressure-head loss and cavitation destruction that are caused by Joule-Thomson valve used in the conventional air separation process. However, "Liquid expander" has disadvantages as follows. 1) the cold loss of the liquid expander is relatively large, wherein one side of the nozzle chassis of the liquid expander is directly exposed in the air, and the other side thereof is the low temperature liquid refrigerant. Therefore, the cold loss through the nozzle chassis is very large, which decreases the efficiency of the liquid expander. In addition, the liquid expander uses the nozzle adjusting mechanism that gets through the nozzle chassis, which also increases the cold loss of the liquid expander and causes a result that the nozzle adjusting mechanism cannot be operated normally. 2) the nozzle cover plate is connected to the nozzle chassis only by the pin, and the compression margin of the compression spring of the nozzle cannot be adjusted, which increases the difficulty of orientation and installation in the axial direction while the precision is difficult to be guaranteed. 3) the diffuser tube of the impeller outlet and the nozzle assembly are manufactured as a whole, which increases the difficulty of axially orientating the complete machine. 4) the impeller outlet does not use any effective device for decelerating high-velocity media and subsequently raising its pressure, so at the impeller outlet, media velocity is high and the flow loss is large. The submerged liquid turbine developed by Japanese Ebara Company has disadvantages as follows. 1) the structure that turbine rotor and generator rotor are coaxial is used, so the impeller is of the same size as the generator and the volume of the complete machine is relatively large, which is only appropriate for applications of large flow rates; 2) the generator is completely immersed in low temperature media, so the requirement of cable materials of the generator, the requirement of the sealing performance of the generator, and the requirement of the insulating property of the generator are stringent; 3) the braking method is not flexible, wherein only electrical generator may be utilized for braking, and the submerged liquid turbine is not appropriate for using air blower and pump to brake.

SUMMARY OF THE PRESENT INVENTION

An object of the present invention is to provide a cryogenic liquid turbine for throttling low-temperature and high-pressure liquefied gases, so as to overcome disadvantages such as considerable cold loss, considerable flow loss at impeller outlet, and the structure of the whole machine is difficult to be orientated and installed. The cryogenic liquid turbine replaces the liquid Joule-Thompson valves conventionally used in the large-scale energy consumption low temperature cycle devices of air separation, liquefied natural gas (LNG), etc. to reduce vaporization rate and recover high-level pressure head of the throttled liquefied gases.

In order to accomplish the above object, the present invention uses technical schemes that are described as follows.

A cryogenic liquid turbine comprises:
a rotor,
a machine housing,
a nozzle assembly,
a volute, and
a diffuser pipe;
wherein the rotor comprises:
a shaft,
an impeller, and
a coupling.

The shaft is rotatably fixed in the machine casing by two thrust journal bearings; two ends of the shaft are both in a form of triangular polygon; one end of the shaft is connected to the impeller by a fastening screw; the other end of the shaft is connected to the coupling; a generator, a pump, or an air blower can be used to brake; and the rotor avoids an oil seal of oil slinger ring structure, in such a manner that rotating parts are reduced and operation reliability of the machine is enhanced.

A cold barrier structure is realized mainly by positioning the nozzle assembly in the volute; the volute is put into a perlite cold box for thermal insulation; an insulating pad is applied between the volute and the machine housing to insulate the heat; in such a manner that a low temperature liquid is not directly contacted to the machine housing exposed in an atmospheric environment, so a coldness loss is decreased to a maximum extent.

The nozzle unit comprises:
a nozzle turntable,
a nozzle chassis,
a nozzle cover plate
a nozzle compression plate,
a nozzle compression flange,
nozzle vanes, and
a nozzle vane adjusting mechanism.

The whole nozzle assembly is connected to a seal gas part by the nozzle compression flange, so as to be connected to the machine housing. The nozzle vane is fixed rotatably between the nozzle chassis (assembled with the nozzle turntable), and the nozzle cover plate by a cylindrical pin. The nozzle compression plate uses a disc spring that can permit a margin to compress the nozzle vane, so as to guarantee the nozzle vane a certain pre-compactness. The nozzle turntable is connected rotatably in an axial direction to the nozzle chassis, and is connected to the nozzle adjusting mechanism that passes through the volute for adjusting a nozzle angle, so as to meet off-design condition operation.

The diffuser pipe is fixed and installed axially with the volute to reduce flow velocity at impeller outlet and reduce flow loss. A shroud side seal is axially fixed on the nozzle compression flange; a shaft seal is fixed with the seal gas part; the seal gas part and the oil seal are both axially fixed on the machine housing by a orientating bolt for easy axial positioning and assembling the machine units.

In comparison with the existing technology of the cryogenic liquid turbine, advantages of the present invention are as follows. (1) effective cold barrier structure is used, in such a manner that the coldness loss of the machine is reduced effectively, and efficiency of energy utilization is enhanced, which reduces the power consumption of a low temperature air separation device and a low temperature liquefied device. (2) the present invention uses the diffuser pipe at the impeller outlet, in such a manner that the impeller outlet velocity is effectively reduced, and thus the flow loss is reduced. (3) the present invention modifies the structures of several related parts, which provides the convenience for orientating and installing axially the parts of the machine These and other objectives, features, and advantages of the present invention will become apparent from the following detailed description, the accompanying drawings, and the appended claims.

BRIEF DESCRIPTION OF THE DRAWINGS

The FIGURE is a structure diagram for assembling a cryogenic liquid turbine of the present invention.
1. a volute,
2. an thermal insulation pad,
3. a cold box,
4. a seal gas part,
5. a shaft seal,
6. an oil seal,
7. a connector,
8. a lifting eye bolt,
9. a machine housing,
10. shaft,
11. an oil outlet,
12. a thrust journal bearing,
13. a gas seal channel,
14. a nozzle turntable,
15. a bolt,
16. a positioning pin,
17. a nozzle chassis,
18. nozzle vanes,
19. an impeller,
20. a diffuser pipe,
21. an impeller fastening screw,
22. impeller shroud side seal,
23. a nozzle cover plate,
24. a cylindrical pin,
25. a disc spring,
26. a nozzle compression plate, and
27. a nozzle compression flange.

DETAILED DESCRIPTION OF THE PREFERRED EMBODIMENT

Referring to FIGURE and embodiments, the present invention is further described in details as follows.

Referring to the FIGURE, a cryogenic liquid turbine comprises:
a machine housing 9,
a thrust journal bearings 12,
a rotor,
a nozzle unit,
a volute 1,
a diffuser pipe 20,
a sealing element, and
a cold box 3;
wherein, the machine housing 9 comprises:
a lifting eye bolt 8,
an oil outlet 11,
a bearing temperature measuring hole,
a bearing oil supplying hole and
an air supplying hole of a gas seal,
which are all connected by a connector 7 to corresponding pipelines;
wherein the rotor comprises:
a shaft 10,
an impeller 19,
and a coupling;
wherein the nozzle assembly comprises:
a nozzle turntable 14,
a nozzle chassis 17,
a nozzle cover plate 23,
a nozzle compression plate 26,
a nozzle compression flange 27,
nozzle vanes 18, and
a nozzle adjusting mechanism;
wherein the sealing element comprises:
a impeller shroud side seal 22,
a shaft seal 5,
a seal gas part 4, and
an oil seal 6.

The shaft 10 is fixed rotatably in the machine housing 9 by the two thrust journal bearings 12 that are respectively on a left side and on a right side, for guaranteeing that the rotor operates stably and reliably with restrained axial and radial displacement. A triangular polygon section of shaft 10 is fitted to triangular polygon hole of the impeller 19, and both are fixed by an impeller fastening screw 21, and the other end of the shaft 10 is fitted with the coupling. Therefore, various braking forms are applicable. The impeller 19 is a shrouded, or a semi-shrouded type impeller as well as an unshrouded impeller. The rotor avoids an oil seal in a slinger structure and reduces a use of a rotating part, for improving operation reliability. Cryogenic liquid radially enters into impeller, and axially flows out at impeller outlet, which meets the condition that near-zero swirling velocity at impeller outlet is produced to reduce flow loss inside the impeller 19.

The nozzle compression flange 27 of the nozzle unit compresses axially the nozzle assembly to the seal gas part 4 by a bolt 15, so as to be axially fixed on the machine shell 9; the nozzle chassis 17 is axially fixed on the seal gas part 4 by the bolt 15; the nozzle vane 18 is mounted rotatably between the nozzle chassis 17 (assembled with the nozzle turntable 14) and the nozzle 23 by a cylindrical pin 24, and is compressed by the disc spring 25 through the nozzle compression plate 26 to keep a certain pre-compactness; the nozzle turntable 14 is fitted rotatably to the nozzle chassis 17 by a pin 16 to adjust nozzle vane stagger angle through an adjusting mechanism; the impeller shroud side seal 22 is fixed axially on the nozzle compression flange 27 by a bolt; the shaft seal 5 is fixed on the seal gas part 4 by a bolt; in such a manner, the nozzle assembly, the impeller shroud side seal 22, and the shaft seal 5 of a impeller disk side are combined as a whole to be installed and fixed with the machine housing 9.

Referring to FIGURE, the oil seal 6 is fixed axially to the machine housing 9. The oil seal 6 seals the oil through seal teeth thereon and seal gas. The diffuser pipe 20 is fixed axially to the volute 1, for reducing flow velocity at the impeller outlet and reducing flow loss.

An overall design scheme of the cryogenic liquid turbine is that impeller end of rotor and the nozzle assembly are included in the volute 1, for preventing that a low temperature liquid directly contacts the machine housing 9 exposed in an atmospheric environment, and for reducing a coldness loss to a maximum extent; meanwhile, an thermal insulation pad 2 is used between the volute 1 and the machine housing 9 to insulate heat, and the volute 1 is put into a perlite cold box 3 to insulate the heat, for reducing a cold loss.

An operating principle of the present invention is described as follows.

By using a throttling effect of low-temperature and high-pressure liquefied gases, pressure head of the low-temperature and high-pressure liquefied gases that flows into the cryogenic liquid turbine is converted to a mechanical energy, and is output by the shaft 10, in such a manner that a wasted pressure head is recovered. In the meantime, vaporization of liquefied gas is suppressed effectively or avoided completely, in such a manner that gas extraction rate of air separation unit is increased, and a system power consumption is reduced.

After the low-temperature and high-pressure liquefied gases flow into the volute 1 through the pipeline, the liquid is uniformly distributed over the nozzle ring through a flow passage inside the volute 1. After passing through the nozzle vane passage 18, the liquid is accelerated, and pressure head is converted into a kinetic energy. The liquid radially enters into the impeller 19 as shown in the FIGURE, the liquid drives the impeller to rotate and does mechanical work to the impeller 19, in such a manner, the pressure head of the liquid thereof is converted into power of shaft rotating at a high speed. After the liquid pressure is reduced, to the level required by the technological process, the liquid is discharged from the exit of the impeller 19. The impeller 19 is connected to and fixed with the shaft 10 by a triangular polygon matching. Because moment of inertia of the triangular polygon matching is relatively large and strength as well as a stiffness of the triangular polygon matching are high, a good stress distribution of the structure is guaranteed, so the triangular polygon shaft is suitable for the cryogenic liquid turbine having characteristics that rotational speed is high and shaft power is relatively large. After the liquid flows from the impeller 19 into the diffuser pipe 20, liquid velocity is gradually reduced, the flow loss is reduced, and its static pressure is increased.

A method for solving a problem of a cold barrier of the cryogenic liquid turbine comprises steps of:

putting the rotor impeller end and the nozzle assembly inside the volute 1, and putting the whole section of the volute 1 is into the perlite cold box 3 to insulate the heat, in such a manner that the low temperature liquid is not directly contacted to the machine housing 9 exposed in the atmospheric environment, so the coldness loss is reduced in the maximum extent; utilizing the insulation pad 2 between the volute 1 and the machine housing 9 at a same time to insulate the heat, for reducing the cold loss.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A cryogenic liquid turbine comprising:
   a rotor,
   a machine housing,
   a nozzle assembly,
   a volute, and
   a diffuser pipe;
   wherein, an impeller end of said rotor and said nozzle assembly are positioned in said volute; a perlite cold box surrounds at least said volute to insulate heat; an insulation pad is positioned between said volute and said machine housing to insulate said heat.

2. The cryogenic liquid turbine, as recited in claim 1, wherein said rotor comprises:
   a shaft,
   an impeller, and
   a coupling;
   wherein, said shaft is rotatably fixed in said machine housing by two thrust journal bearings; two ends of said shaft are in a form of a triangular polygon; one end of said shaft is fitted to said impeller and fixed by an impeller fastening screw; the other end of said shaft is connected to said coupling.

3. The cryogenic liquid turbine, as recited in claim 1, wherein, an impeller outlet is connected to said diffuser pipe, said diffuser pipe configured for reducing outlet flow velocity at said impeller outlet and reducing flow loss.

4. The cryogenic liquid turbine, as recited in claim 1, wherein, said nozzle assembly is connected to said machine housing by a nozzle compression flange, and said nozzle compression flange is axially fixed on an impeller shroud side seal; a seal gas part and an oil seal are axially fixed on said machine housing by a bolt, and a shaft seal is axially fixed on said seal gas part; said diffuser pipe is axially fixed on said volute, in such a manner that said cryogenic liquid turbine is easy to be accurately orientated and installed in an axial direction.

5. The cryogenic liquid turbine, as recited in claim 1, wherein said nozzle assembly comprises:
   a nozzle turntable,
   a nozzle chassis,
   a nozzle cover plate,
   a nozzle compression plate,
   a nozzle compression flange,
   nozzle vanes,
   and a nozzle vane stagger adjusting mechanism;
   wherein, said nozzle assembly is connected to a seal gas part by said nozzle compression flange, so as to be connected to said machine housing; said nozzle vanes are mounted rotatably between said nozzle chassis and said nozzle cover plate by a cylindrical pin; said nozzle turntable is connected rotatably in an axial direction to said nozzle chassis, and is connected to said nozzle vane stagger adjusting mechanism that passes through said volute.

6. The cryogenic liquid turbine, as recited in claim 5, wherein, said nozzle vanes are compressed by said nozzle compression plate through a disc spring having an adjustable margin, and said nozzle compression plate uses said disc spring to adjust a compactness degree of said nozzle vanes.

7. The cryogenic liquid turbine, as recited in claim 1, wherein, a non-impeller end of said shaft is connected to a coupling; a generator, a pump, or a blower is used to brake said cryogenic liquid turbine.

* * * * *